United States Patent [19]
Dengel et al.

[11] 3,926,995

[45] Dec. 16, 1975

[54] THEOPHYLLINE DERIVATIVES

[75] Inventors: Ferdinand Dengel, Wilhelmsfeld;
Oskar Ehrmann, Mannheim;
Ludwig Friedrich, Mannheim;
Frank Zimmermann, Mannheim, all of Germany

[73] Assignee: Knoll A.G. Chemische Fabriken, Ludwigshafen (Rhine), Germany

[22] Filed: Aug. 3, 1973

[21] Appl. No.: 385,320

[30] Foreign Application Priority Data
Aug. 8, 1972 Germany.............................. 2239012

[52] U.S. Cl. ................. 260/256; 260/253; 424/253
[51] Int. Cl.² ...................................... C07D 473/08
[58] Field of Search .................................... 260/256

[56] References Cited
UNITED STATES PATENTS
3,245,994  4/1966  Klingler et al. ...................... 260/256
FOREIGN PATENTS OR APPLICATIONS
1,237,578  3/1967  Germany ............................ 260/256

*Primary Examiner*—Donald G. Daus
*Assistant Examiner*—Anne Marie T. Tighe
*Attorney, Agent, or Firm*—Curtis, Morris & Safford

[57] ABSTRACT

7-[N-methyl-N-(β-phenylethyl)-3-aminopropyl]-theophylline compounds substituted on the phenyl nucleus by chlorine, hydroxyl or lower alkoxy and preferably also by fluorine, trifluoromethyl or another chlorine or hydroxyl are disclosed to have excellent anti-allergy and bronchio-dilatatory efficacy without sedative side effects.

2 Claims, No Drawings

THEOPHYLLINE DERIVATIVES

The present invention relates to pharmacologically active basic substitued theophylline derivatives.

It is known that certain basic substituted xanthine derivatives have valuable pharmacological properties. Thus, for example, [N-methyl-N-(3', 4'-dimethoxybenzyl)-β-aminoethyl]-theobromine possesses both coronary dilatory and blood pressure reducing properties.

According to the present invention, there are provided compounds of the formula I

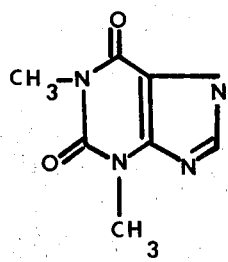   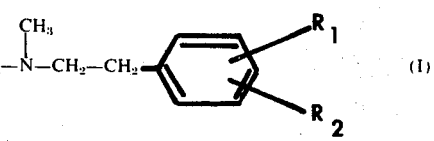   (I)

in which $R_1$ represents chlorine, hydroxyl or lower alkoxy (of 1 to 4 carbon atoms) and $R_2$ represents hydrogen in the 4-position or fluorine, chlorine, trifluoromethyl, or hydroxyl in any position of the ring. Compounds in which $R_1$ and $R_2$ are substituted in the 3- and 4-positions and in which $R_2$ is fluorine, chlorine, trifluoromethyl or hydroxyl are preferred.

Since these compounds possess good anti-allergy and bronchio-dilatatory properties without sedative side effects, the present invention also provides pharmaceutical compositions comprising these compounds in association with pharmaceutically acceptable carriers.

The present invention also relates to processes for preparing such compounds.

According to a first embodiment of the process of the present invention, theophylline is reacted with a halogenoalkylamine of the formula (II).

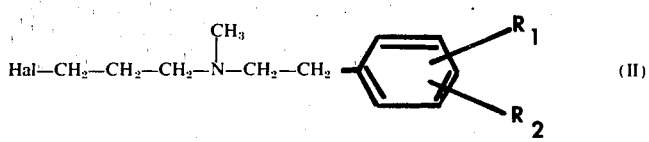   (II)

wherein Hal represents halogen and $R_1$ and $R_2$ have the above-stated significance, in the presence of a hydrogen halide bonding agent.

According to a second embodiment of the process of the present invention, 7-(3-halogenopropyl)-theophylline is condensed with a nucleus-substituted N-methyl-β-phenylethylamine of the formula III

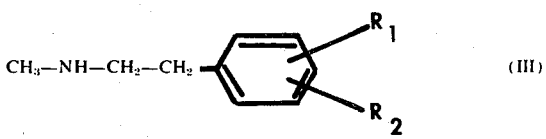   (III)

According to a third embodiment of the process of the present invention 7-(3-methylaminopropyl)-theophylline is reacted with a nucleus-substituted phenylethylhalide of the formula IV

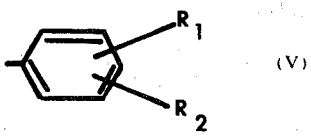   (IV)

According to a fourth embodiment of the process of the present invention, a secondary amine of the formula V

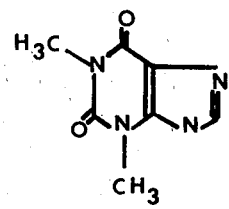   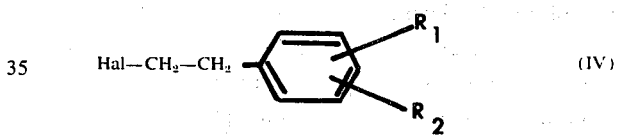   (V)

is methylated, in a known manner on the basic nitrogen atom.

According to a fifth embodiment, a compound of the formula I substituted on the benzene nucleus by an alkoxy-, methylenedioxy-, benzyloxy- or benzylcarboxy-group is subjected to ether splitting.

In the first embodiment of the process, an alcoholic solution is employed, using an alkali alcoholate as the condensing agent or, alternatively, an aqueous alcoholic solution using soda lye may be employed. In this case, the starting materials are heated under reflux for a period of time with agitation. It has been found particularly advantageous to stir a suspension of theophylline, dry potassium carbonate and a compound of the Formula II in an inert solvent, preferably acetone or butanone, at the boiling temperature of the solvent.

In the second embodiment of the process, it has been found that as the hydrogen halide bonding agent, the addition of a second mol of the base (III) suffices. The reactants are heated together for some hours, in an oil bath, to a temperature of about 140°C. If a suitable hot solvent is then added, such as toluene or xylene, one mol of the hydrogen halide salt of the base III is precipitated out in a crystalline form, and may be filtered off. The filtrate then contains the basic product of the process. It is also possible to carry out the reaction in boiling xylene, or with a reactive halide in toluene. In this case, instead of utilizing an additional mol of the base (III), dry calcium carbonate or a tertiary base such as pyridine or triethylamine is employed as an acid-bonding agent. These working conditions also apply to the third embodiment of process.

The introduction of the methyl group into a secondary base of Formula V for conversion into a compound of Formula I in accordance with the invention may be carried out according to the fourth embodiment of the process by treatment with a methyl halide or dimethyl-sulfate, followed by boiling with formalin or paraformaldehyde and formic acid. The methylation may also be carried out with an alcoholic solution of the secondary base V mixed with formaldehyde in the presence of palladium or nickel catalyst by shaking with hydrogen, or by treating with an aluminum amalgam or sodium borohydride or suitable reducing agent.

In order to obtain the products in accordance with the invention which have free phenolic hydroxyl groups, the compounds of Formula I, if $R_1$ and/or $R_2$ is alkoxy, benzyloxy or benzylcarboxy or, deviating from the Formula I, jointly form a methylene dioxide group, are treated with aqueous hydrogen halide acids under the influence of heat. To improve the solubility, it is possible, if necessary, to add a suitable solvent such as glacial acetic acid or acetic anhydride. If hydrochloric acid is used as the demethylating agent, then it is necessary, in some cases, to heat under pressure. If the starting substances are benzyloxy or benzylcarboxy compounds, then these may also be converted, by hydrogenation with palladium catalysts, into the phenolic products.

A further possibility of carrying out the process of the present invention consists in the use of a bonded hydrogen halide acid in the form of a salt such as, for example, pyridinehydrochloride. The procedure is such that the reactants are fused, possibly with the addition of a suitable solvent such as glacial acetic acid or acetic anhydride, at an elevated temperature.

The ether splitting may be carried out with an organic acid halide either in the presence or absence of a catalyst, whereby the reactivity increases in accordance with the sequence chloride - bromide - iodide. As catalysts, both metal and non-metal halides may be used. Zinc chloride, stannic-(IV)-chloride and boron tri-fluoride are particularly suitable. A further possibility consists in the use of a electrophilic metal halide such as, for example, aluminum chloride or bromide.

The new compounds possess a histaminolytical effect over a wide spectrum against both endogenic (anaphylactic) and exogenic histamine reactions. These properties make them valuable pharmaceuticals in the treatment of a number of diseases, such as bronchial asthma, urticaria, hay-fever, skin complaints and allergies. Moreover, the acute toxicity (see Table 2, Column C) of the compounds relative to their histaminological effect (see Table 1, Column A), and hence the range of therapeutic use of the new substances (see Table 2, Column C:A), in comparison to known substances is considerably better. Of great importance is the fact that the compounds of the invention, unlike antihistamines heretofore proposed, do not have sedative side-effects.

The histaminololytic effectiveness of the compounds was tested according to the method of H. Konzett and R. Roessler [Arch. exp. Path. Pharm. 195, 71 (1940)] on the broncho-spasms of guinea pigs. In Table I, Column A, there are listed the dosages which reduce the number of broncho-spasms by half ($ED_{50}$).

On the isolated ileum of a guinea pig, the new compounds show a high histaminolytic effect, as may be shown by utilizing the method of R. Magnus [Pfluegers Arch. ges. Physiol. 102, 123 (1904)]. Column B of Table 1, lists the concentrations in $\mu g/ml$ bath liquid which completely stop the initial spasm. The compounds which have proved particularly effective are those in which the ortho positions of the phenyl group are unsubstituted and the meta and para positions are both substituted. Of these compounds, the compounds identified as Nos. 3 and 4 in Table 1 are the most effective.

For therapeutic application, the new substances may be administered in the form of ampoules, tablets, sweets or inhalents. The preferred dose is between 0.1 to 1.0 mg/kg orally or 0.01 to 0.1 mg/kg parenterally, per day.

TABLE 1.

[Chemical structure: $CH_3$-N substituted xanthine connected via -(CH$_2$)$_3$-N(CH$_3$)-(CH$_2$)$_2$- to a phenyl ring with substituents $R_1$, $R_2$, $R_3$, $R_4$]

| No. | $R_1$ | $R_2$ | $R_3$ | $R_4$ | Example | A mg/kg i.v. | B μg/ml |
|---|---|---|---|---|---|---|---|
| 1 | Cl | H | H | Cl | 2, 9 | 0.4 | 10.0 |
| 2 | H | Cl | OCH$_3$ | H | 14 | 0.064 | 1.0 |
| 3 | H | Cl | Cl | H | 1, 10, 17, 19 | 0.012 | 0.01 |
| 4 | H | Cl | OH | H | 20 | 0.004 | 0.1 |
| 5 | Cl | H | Cl | H | 3, 11 | 0.065 | 1.0 |
| 6 | H | OCH$_3$ | Cl | H | 15 | 0.055 | 0.05 |
| 7 | Cl | OCH$_3$ | H | H | 16 | — | 0.5 |
| 8 | H | OH | Cl | H | 21 | 0.035 | 1.0 |
| 9 | Cl | OH | H | H | 22 | — | 1.0 |
| 10 | H | OH | OH | H | 23 | 0.28 | 5.0 |
| 11 | Cl | H | H | H | 4 | 0.23 | 50.0 |
| 12 | H | Cl | H | H | 5 | 0.04 | 0.5 |
| 13 | H | F | OCH$_3$ | H | 7 | 0.05 | 0.5 |
| 14 | H | CF$_3$ | H | H | 8 | 0.065 | 0.5 |
| 15 | Theophylline | (Comparison substance) | | | | 3.0 | >100.0 |
| 16 | Bamiphylline | (Comparison substance) | | | | >10.0 | >100.0 |
| 17 | Cinnarizine | (Comparison substance) | | | | 0.45 | 5.0 |

TABLE 2.

| Substance No. | Acute toxicity, albino mouse LD$_{50}$ in mg/kg i.v. | Therapeutic range C:A |
|---|---|---|
| 3 | 33.7 | 3370 |
| 4 | 30.0 | 7500 |
| 15 | 160.0 | 53.3 |

Some of the starting substances used for preparing the new compounds have not hitherto been described. They are obtainable as follows:

The alkylamine halide of Formula II is obtained by condensation of the corresponding nucleus-substituted β-phenylethylamine with 3-chloropropanol. The secondary aminoalcohols thus formed are then, in a conventional manner, such as by means of formaldehyde and formic acid, methylated on the nitrogen atom and subsequently the hydroxyl group is substituted by treatment with thionyl chloride. If the N-monomethyl derivative of the β-phenylethylamine (Formula III) is used, tertiary aminoalcohols are obtained in a single step, and the methylation of the nitrogen is unnecessary.

The preparation of 7-(3-halogenopropyl)-theophylline and 7-(3-aminopropyl)-theophylline have already been described.

7-(3-methylaminopropylene)-theophylline as a free base may be prepared from 8-(3-halogenopropyl)-theophylline. The latter is first condensed with N-methylbenzylamine to form 7-[3-(N-methyl-N-benzyl)-aminopropyl]-theophylline and the benzyl group is subsequently removed with Pd/H$_2$.

The compounds of the Formula III may be prepared in various ways. Hence, nucleus-substituted benzene compounds are often converted, by treatment with formaldehyde and hydrochloric acid chloromethylation into the analogous benzyl chlorides. These benzyl chlorides may also be prepared by way of benzyl alcohols, from aromatic carboxylic acids or their esters by reduction with lithium alanate (lithium aluminum hydride) or from nucleus-substituted aldehydes by catalytic hydrogenation or treatment with reducing agents, followed by chlorination of the benzyl alcohols. From the benzyl chlorides, the corresponding benzyl cyanides are easily obtainable, for example by reacting them with alkali metal cyanides in dimethylformamide or dimethylsulfoxide. The β-phenylethylamine is obtained therefrom, in a known manner, by catalytic hydrogenation. From the primary β-phenylethylamines thus obtained in this manner, by treatment of their benzocompounds with dimethyl sulfate or iodomethane, or even by reduction of their N-formyl compounds with lithium alanate, the amines of the Formula III may be prepared.

The compounds of the Formula IV are prepared from the above-described nuclear-substituted benzyl cyanides. These are saponified to form the phenylacetic acids, which upon reduction with lithium alanate yield β-phenylethanols, which are then reacted with thionyl chloride to produce the required compounds.

The compounds of the Formula V are obtainable in various ways. They may, for example, be produced from nucleus-substituted β-phenylethylamines by reaction with 7-(3-halogenopropyl)theophylline.

The invention will be further described, by way of example, with reference to the following examples. In all of these examples, the values for the melting points have been corrected.

EXAMPLE 1

7-[N-methyl-N-(β-3,4-dichlorophenylethyl)-3-aminopropyl]theophylline.

a. Manufacture of the starting materials

I. N-methyl-β-3,4-dichlorophenylethylamine

A solution of β-3,4-dichlorophenylethylamine (41.2 g; 0.217 mol) in toluene is mixed with 12.0 g formic acid (0.2604 mol or 1.2 × 0.217 mol) and boiled for 4 hours under reflux utilizing a water separator. 8.4 ml water are removed during this stage. The toluene is then evaporated and the residue is distilled in vacuo for a yield of 41.0 g, representing 90% of the theoretical yield, of the N-formyl-compound having a boiling point of 168° to 171° C/0.02 Torr. The thus-obtained formamide (41 g; 0.188) is dissolved in 200 ml. tetrahydrofuran and added dropwise, with stirring onto a boiling suspension of 1 l. of lithium alanate (lithium aluminum hydride, 2 × 0.188 mol) in 200 ml. tetrahydrofuran in a three-necked flask. The boiling is continued for 4 more hours and the product is decomposed by adding water and sodium lye dropwise thereto. Extraction is preformed. The aluminum hydroxide is filtered off under suction and the filtrate is evaporated. The residue is dissolved in 2N nitric acid and shaken with toluene. The aqueous portion is mixed with concentrated sodium lye, the base is absorbed in toluene, the solvent is evaporated and the residue is distilled in vacuo. At 96° to 97° C/0.3 Torr, N-methyl-β-3,4-dichlorophenylethylamine (32.3 g representing 86% of the theoretical yield, $n_D25$ of 1.5489) distils over. The hydrochloride, recrystallized from alcohol and ether, melts at 197° to 200° C.

II.

N-methyl-N-(β-3,4-dichlorophenylethyl)-3-aminochlorpropane.

N-methyl-β-3,4-dichlorophenylethylamine (133.5 g; 2 × 0.328 mol) and 3-chloropropanol (31 g; 0.328 mol) in toluene are boiled under reflux, with agitation for 24 hours. After separating the precipitated N-methyl-β-3,4-dichloroethylamine-hydrochloride, the N-methyl-N-(3-hydroxylpropyl)-β-3,4-dichlorophenylethylamine which remains in the form of an oil after evaporation of the solvent, is absorbed in chloroform, and mixed dropwise with 43.0 g. thionyl chloride (1.2 × 0.328 mol). The mixture is then boiled for 2 hours under reflux. After evaporating the chloroform, the reaction product is absorbed in hot acetone. On cooling, the hydrochloride of the N-methyl-N-(β-3,4-dichlorophenylethyl)-3-aminochloropropane, having a melting point of 145° to 146° C precipitates out. A yield of 73.9 g, representing 76.2% of the theoretical yield, is obtained. The free base boils at 112° to 116° C/0.2 Torr and its refractive index ($n_D^{25}$) is 1.5392.

b. Preparation of the end product.

N-methyl-N-(β-3,4-dichlorophenylethyl)-3-aminochloropropane hydrochloride (158.6 g; 0.5 mol) is converted into the free base and the latter dissolved in 100 ml. toluene. Over a period of 30 minutes, this is added dropwise to a mixture, boiling under reflux, of 250 isopropanol (250 ml), sodium hydroxide (20 g; 0.5 mol), water (14 ml) and theophylline (90.5 g; 0.5 mol). Boiling under reflux is continued for 3 hours, and the precipitated sodium chloride is filtered off under suction. The filtrate is then evaporated and the oily residue dissolved in toluene. Hydrogen chloride gas is passed through the solution until a strong acid reaction occurs. 7-[N-methyl-N-(β-3,4-dichlorophenylethyl)-3-aminopropylene]-theophylline hydrochloride is precipitated as a white crystalline powder. After crystallization from isopropanol, a yield of 200 g, representing 83.4% of the theoretical yield of the salt, is obtained which has a melting point of 225° to 228° C. This salt contains 1.5 mol HCL per mol base and its aqueous solution is strongly acidic. If during production of the salt, an excess of hydrogen chloride is avoided by accurately neutralizing the free base, the salt precipitates out having a composition which contains 1 mol of HCL per mol of base. The salt has the same melting point but its aqueous solution is neutral.

The above-described condensation of theophylline with N-methyl-N-β-(3,4-dichlorophenylethyl)-3-aminochloropropane may also be carried out using acetone or butanone as the solvent and dry potassium carbonate as the substance to remove the hydrogen halide.

EXAMPLE 2

7-[N-methyl-N(β-2,6-dichlorophenylethyl)-3-aminopropyl]-theophylline.

a. Preparation of the starting materials.

I. N-methyl-β-2,6-dichlorophenylethylamine

This compound is obtained from β-dichlorophenylethylamine [J. Augstein et al., J. Med. Chem. 10 (1967) 399] by reduction of its N-formyl compound with lithium alanate as described in Example 1 (a) I. The hydrochloride melts at 171° to 174° C.

II.

N-methyl-N-(β-2,6-dichlorophenylethyl)-3-aminochloropropane

The compound is obtained from N-methyl-β-2,6-dichlorophenylethylamine in a manner analogous to that described in Example 1 (a) II, that is to say by condensation with chloropropanol and subsequent treatment of the aminoalcohol with thionyl chloride. The hydrochloride melts at 168° to 170° C.

b. Preparation of the end product.

N-methyl-N-(β-2,6-dichlorophenylethyl)-3-aminochloropropane hydrochloride (90.3 g; 0.25 mol) and theophylline (45.0 g; 0.25 mol) are condensed and worked up in the same manner as described in Example 1 (b). The 7-[N-methyl-N-(β-2,6-dichlorophenylethyl)-3-aminopropyl]-theophylline base is purified by conversion into the dioxalate. This, after crystallization from isopropanol, melts at 192° to 195° C. The yield is 91.2 g which represents 71% of the theoretical yield.

The base released from the dioxalate reacts in solution in toluene, with hydrogen chloride gas to produce the hydrochloride, which latter melts at 257° to 260° C.

EXAMPLE 3

7-[N-methyl-N-(β-2,4-dichlorophenylethyl)-3-aminopropyl]-theophylline.

a. Preparation of the starting material

I. N-methyl-β-2,4-dichlorophenylethylamine

This compound is obtained from β-2,4-dichlorophenylethylamine [W. N. Cannon et al., J. Org. Chem.

22 (1957) 1323] by reduction of its N-formyl compound with lithium alanate. The hydrochloride melts at 183° to 185° C.

II.
N-methyl-N-(β-2,4-dichlorophenylethyl)-3-aminochloropropane

This compound is obtained in a manner analogous with that described in Example 1 (a), from N-methyl-β-2,4-dichlorophenylethylamine by condensation with 3-chloropropanol and subsequent treatment of the aminoalcohol with thionyl chloride. Its dioxalate melts at 152° to 154° C.

b. Preparation of the end product.

N-methyl-N-(β-2,4-dichlorophenylethyl)-3-aminochloropropane dioxalate (92.7 g; 0.25 mol) and theophylline (45.0 g; 0.25 mol) are condensed together in a manner similar to that described in Examples 1 and 2 and worked up. Hydrogen chloride gas is introduced into a solution in toluene of the crude base; the hydrochloride being precipitated as a white crystalline powder. After crystallization from methanol, this melts at 255° to 257° C. A yield of 79.4 g representing 69% of the theoretical yield is obtained.

EXAMPLE 4

7-[N-methyl-N-(β-2-chlorophenylethyl)-3-aminopropyl]-theophylline.

A three-necked 1 liter flask is provided with a stirring mechanism, a thermometer, a dropping funnel, a gas inlet pipe and a riser pipe. The flask is charged with 7-(3-bromopropyl) theophylline (126.5 g; 0.42 mol) [H. Priewe et al., Chem. Ber. 90 (1957) 1951] and N-methyl-β-2-chlorophenylethylamine (142.7 g; 2 × 0.42 mol) [R. Huisgen et al., Chem. Ber. (1959) 210] which are heated together in an atmosphere of nitrogen with initial stirring, for 90 minutes on an oil bath to a temperature of 145° C. Subsequently at about 120° C., 600 ml. dry toluene are run in and the mixture is stirred until cooled. N-methyl-β-2-chlorophenylethylamine hydrobromide (100.2 g) is extracted therefrom which is precipitated as white crystalline powder and has a melting point of 105° to 107° C. The toluene filtrate is washed with water. The toluene phase is shaken out with 500 ml. 1N HCL and the base is extracted therefrom. The aqueous acid solution is mixed with concentrated soda lye, the base is absorbed in toluene and, after drying over potassium carbonate, is evaporated in vacuo. The residue which remains is 7-[N-methyl-N-(β-2-chlorophenylethyl)-3-aminopropyl]-theophylline, which crystallizes on standing. A yield of 133 g, representing 81% of the theoretical yield is obtained. A sample of the substance, after crystallization from ether melts at 85° to 90° C. During distillation in a bulb tube, it is converted at about 200° to 210° C. (air bath temperature) 0.001 Torr into a bright yellow, viscous oil having an $n_D^{25}$ of 1.5740. It is chromatographically pure.

If 101 g of this substance is dissolved in 400 ml isopropanol and hydrogen chloride gas introduced to cause a weak acid reaction, the hydrochloride is precipitated as a white crystalline powder. After crystallization from methanol 56 g of the hydrochloride, having a melting point of 232° to 235° C., are obtained. By concentrating the mother liquor, a further 34.6 g are obtained. By dissolving the substance in methanol/ethanol (1:2) and adding oxalic acid, the dioxalate is obtained which, after crystallization from methanol, melts at 184.5° to 188° C. Instead of 7-(3-bromopropyl)-theophylline, 7-(3-chloropropyl)-theophylline may be employed. The reaction time then amounts to 3 hours.

EXAMPLE 5

7-[N-methyl-N-(β-3-chlorophenylethyl)-3-aminopropyl]-theophylline.

In a manner similar to that described in Example 4, 7-(3-bromopropyl)-theophylline (126.5 g; 0.42 mol) is condensed with N-methyl-β-3-chlorophenylethylamine (142.7 g; 2 × 0.42 mol) [R. Huisgen et al., Chem. Ber. 92 (1959) 210] and then worked up. After separating the precipitated N-methyl-β-3-chlorophenylethylamine hydrobromide, there is obtained 7-[N-methyl-N-(β-3-chlorophenylethyl)-3-aminopropyl]-theophylline (151 g) as a thick, pale yellow oil which is purified by fractional distillation. The yield of pure substance thus obtained is 104 g, which represents 64% of the theoretical yield. The pure substance boils at 218° to 220° C/0.01 Torr and melts, after crystallization from isopropanol, at 73.5° to 74.5° C. The refractive index ($n_D^{25}$) is 1.5750.

The hydrochloride is precipitated by passing hydrogen chloride gas into isopropanol solution and is obtained as a white crystalline powder which melts, after crystallization from ethanol, at 210° to 211° C. The dioxalate salt is produced in a manner analogous to that described in Example 4 and melts, after crystallization from methanol, at 205° to 206° C.

EXAMPLE 6

7-[N-methyl-N-(β-4-fluorophenylethyl)-3-aminopropyl]-theophylline.

In a manner analogous to that described in Example 4, 7-(3-bromopropyl)-theophylline (301.2 g; 1 mol) and N-methyl-β-4-fluorophenylethylamine (306.2 g; 2 mol) [C. M. Suter et al., J. Am. Chem. Soc. 63, 609 (1941)] are condensed together. The precipitated N-methyl-β-4-fluorophenylethylamine hydrobromide is separated off and the base thus obtained is purified by vacuum At 226° C/0.03 Torr, a yield of 280.5 g, representing 74% of the theoretical yield, of 7-N-methyl-N-(β-4-fluorophenylethyl)-3-aminopropyl]-theophylline is converted into a pale yellow viscous oil, which is crystallized from an ether solution and melts at 59° to 61° C.

If the compound thus obtained is dissolved in methanol, and an excess of hydrogen chloride is introduced, a spongy white salt is precipitated which contains 2 mols HCL per mol base and melts under rapid heating at 242° to 244° C. Its aqueous solution is strongly acidic; a 5% solution having a pH of 0.85. If, on the other hand, the methanol solution of the base is neutralized with exactly one equivalent of hydrogen chloride, the monohydrochloride is precipitated. This, after crystallizing from methanol, melts at 237° to 239° C. under rapid heating and its aqueous solution is substantially neutral, a 5% solution having a pH of 6.0. The dioxalate is obtained and crystallized from ethanol and has a melting point of 176° to 177.5° C.

EXAMPLE 7

7-[N-methyl-N-(3-fluoro-4-methoxyphenylethyl-3-aminopropyl]-theophylline.

a. Preparation of the starting material

N-methyl-β-3-fluoro-4-methoxyphenylethylamine

β-3-fluoro-4-methoxyphenylethylamine (477.7 g; 2.82 mol) [K. Kraft, Ber. 84, 150 (1951)] and 98% formic acid (146 g; 1.1 × 2.82 mol) are dissolved in 1 l. toluene and boiled under reflux. The water formed during the reaction is removed. The remainder, after distillation of the toluene solution, in N-formyl-β-3-fluoro-4-methoxy-phenylethylamine in a yield of 532 g representing 96% of the theoretical yield. It has a boiling point of 162° C/0.03 Torr and an $n_D{}^{25}$ of 1.5288.

265.0 g (1.343 mol) of this product is dissolved in 1 l. tetrahydrofuran. The solution is added dropwise with stirring over a period of 1 hour in an atmosphere of a mixture boiling under reflux of lithium alanate (69 g; 1.8 × 0.75 × 1.343 mol) in 3 l. tetrahydrofuran. The mixture is then boiled under reflux for 6 hours. The reaction mixture is subsequently decomposed by the dropwise addition of water and soda lye. The aluminum hydroxide thus produced is filtered under suction. The filtrate is evaporated, the residue obtained therefrom is dissolved in hydrochloric acid and freed from impurities by shaking with toluene. By addition of 40% soda lye, the base is again precipitated, which is then dissolved in benzene. After evaporation of the solvent, the residue is distilled. At 139° to 140° C/16 Torr, N-methyl-β-3-fluoro-4-methoxyphenylethylamine distils over as a colorless oil having an $n_D{}^{25}$ of 1.5051. 206 g are obtained, representing 84% of the theoretical yield. The hydrochloride which is obtained from isopropanol and crystallized from isopropanol and ethanol (5:1), melts at 181° to 182.5° C.

b. Preparation of the end product

If 7-(3-bromopropylene)-theophylline (189.5 g; 0.63 mol) is condensed with N-methyl-β-3-fluoro-4-methoxy phenylethylamine (231 g; 2 × 0.63 mol) in the manner described in Example 4, not only is there obtained 152 g N-methyl-β-3-fluoro-4-methoxyphenylethylamine hydrobromide, but also 182 g, representing 74% of the theoretical yield, 7-[N-methyl-N-(β-3-fluoro-4-methoxyphenylethyl)-3-aminopropyl]-theophylline having a boiling point of 231° C/0.4 Torr and a refractive index $n_D{}^{25}$ of 1.5527.

The hygroscopic hydrochloride, obtained from ethanolic solution of the base using hydrogen chloride gas, melts after crystallization from methanol and ethanol (5:1) at 217° to 218° C.

EXAMPLE 8

7-[N-methyl-N-(β-3-trifluoromethylphenylethyl)-3-aminoproply]-theophylline a. Preparation of the starting material I. β-3-trifluoromethylphenylethylamine 3-trifluoromethylbenzyl cyanide (233 g; 1.26 mol) [B. E. Rosenkranz et al., J. Chem. Eng. Data 8, 327 (1963)] is dissolved in 1.2 l. methanol containing ammonia (approximately 80 g) and hydrogenated with Raney-Cobalt at 100°/100 atms. The solution which is separated from the catalyst is evaporated and the residue obtained therefrom is dissolved in hydrochloric acid and shaken with toluene to remove impurities. The solution is then mixed with soda lye, the base thus formed is dissolved in benzene, the solvent is evaporated and the residue is distilled. The compound is a transparent oil having a boiling point of 88° C/14 Torr and an $n_D{}^{25}$ of 1.4609. The yield obtained is 195 g, representing 82% of the theoretical yield.

II. N-methyl-β-3-trifluoromethylphenylethylamine

β-3-trifluoromethylphenylethylamine (204 g; 1.08 mol) is dissolved in 500 ml. toluene and mixed with 55 g formic acid (1.1 × 1.08 mol). The mixture is azeotropically distilled to yield the N-formyl compound. After working up and distillation, a yield of 211 g, representing 91% of the theoretical yield of N-formyl-3-trifluoromethylphenylethylamine having a boiling point of 179° C/14 Torr and an $n_D{}^{25}$ of 1.4795 is obtained. 172.8 g (0.8 mol) of the N-formyl compound is dissolved in 1 l. tetrahydrofuran and reduced as described in Example 1 (a) I with 45.5 g lithium alanate (2 × 0.75 × 0.8 mol) in 2 l. tetrahydrofuran. After working up, a yield of 131.5 g, representing 81% of the theoretical yield, of N-methyl-β-3-trifluoromethylphenylethylamine, having a boiling point of 96° to 100° C/14 Torr and an $n_D{}^{25}$ of 1.4598 is obtained. The hydrochloride, which is obtained from an ethanol/ether mixture and is recrystallized from ethyl acetate, melts at 143° to 144° C.

b. Preparation of the end product

The reaction of 7-(3-bromopropyl)-theophylline (80.1 g; 0.27 mol) with N-methyl-β-trifluoromethylphenylethylamine (108.3 g; 2 × 0.27 mol) is effected in a manner analogous to that described in Example 4 and yields 85.1 g, representing 75.6% of the theoretical yield, of 7-[N-methyl-N-(β-3-trifluoromethylphenylethyl)-3-aminopropyl]-theophylline in the form of a pale yellow viscous oil having a boiling point of 210° C/0.05 Torr and an $n_D{}^{25}$ of 1.5373. When recrystallized from diethylether, the base melts at 74.5° to 76° C. A white hydrochloride separates from an ethanolic solution of the base after neutralization with hydrogen chloride gas. After crystallization from a mixture of isopropanol and ethyl acetate (1:1), the salt melts at 169° to 171° C. The dioxalate, from ethanol, melts at 161° to 162° C.

EXAMPLE 9

7-[N-methyl-N-(β-2,6-dichlorophenylethyl)-3-aminopropyl]-theophylline.

a. Preparation of the starting material

N-methyl-β-2,6-dichlorophenylethylamine

This compound is obtained by preparing, by the method described in Example 1 (a) I, the N-formyl compound of β-2,6-dichlorophenylethylamine [J. Augstein et al., J. Med. Chem. 10, 399 (1967)], and subsequent reduction of the amide with lithium alanate. 62% of the theoretical yield (relative to the primary base) of the N-monomethyl compound is obtained, which is isolated in the form of hydrochloride having a melting point of 171° to 174° C.

b. Preparation of the end product

In a three-necked flask, 7-(3-bromopropyl)-theophylline (42.2 g; 0.14 mol) is dissolved in 200 ml. toluene. N-methyl-β-2,6-dichlorophenylethylamine (28.7 g; 0.14 mol) regenerated from the hydrochloride obtained in (a), and triethylamine (14.2 g; 0.14 mol) are added thereto. The mixture is then boiled under reflux for 16 hours. The triethylamine hydrobromide is precipitated and filtered under suction, the filtrate being evaporated in vacuo. The residue obtained therefrom is dissolved in 100 ml. hot isopropanol and mixed with a solution of 12.8 g oxalic acid in isopropanol. On cooling, the dioxalate of the required product is precipitated. After crystallization from isopropanol, there is obtained 28.4 g, representing 46% of the theoretical yield, of 7-[N-methyl-N-(β-2,6-dichlorophenylethyl)-3-aminopropyl]-theophylline dioxalate having a melting point of 192° to 195° C. It is also possible to use N-methyl-β-2,6-dichlorophenylethylamine as the acid bonding agent instead of triethylamine. In such a case, double the stoichiometric quantity must be used.

EXAMPLE 10

7-[N-methyl-N-(β-3,4-dichlorophenylethyl)-3-aminopropyl]-theophylline 7-(3-bromopropyl)-theophylline (42.2 g; 0.14 mol) and N-methyl-β-3,4-dichlorophenylethylamine (28.7 g; 0.14 mol) prepared as described in Example 1 (a), are condensed in the manner described in Example 9 in the presence of triethylamine and worked up. There is thus obtained 7-[N-methyl-N-(β-3,4-dichlorophenylethyl)-3-aminopropyl]-theophylline hydrochloride having a melting point of 225° to 228° C. The yield, after crystallization from isopropanol, is 42.3 g, which is 63% of the theoretical yield.

EXAMPLE 11

7-[N-methyl-N-(β-2,4-dichlorophenylethyl-3-aminopropyl]-theophylline 7-(3-bromopropyl)-theophylline (54.8 g; 0.18 mol) and N-methyl-β-2,4-dichlorophenylethylamine (37.3 g; 0.18 mol) obtained in the manner described in Example 3 (a) I are condensed together in the presence of triethylamine. After working up, there is obtained 50.3 g, representing 60% of the theoretical yield, of the hydrochloride which, when crystallized from methanol has a melting point of 225° to 257° C.

EXAMPLE 12

7-[N-methyl-N-(β-2,5-dichlorophenylethyl)-3-aminopropyl]theophylline 7-(3-bromopropyl)-theophylline (26.2 g; 0.087 mol) and N-methyl-β-2,5-dichlorophenylethylamine (17.8 g; 0.087 mol) [R. Huisgen et al., Chem. Ber. 93 (1960), 1496] are condensed in a manner analogous to that described in Example 9, in the presence of triethylamine. After working up, a toluene solution of the reaction product is accurately neutralized by passing hydrogen chloride gas therethrough. The precipitated hydrochloride is crystallized twice from ethanol. A yield of 15.6 g, which is 56% of the theoretical yield, is obtained. The compound has a melting point of 210° to 212° C.

EXAMPLE 13

7-[N-methyl-N-(β-3,5-dichlorophenylethyl)-3-aminopropyl]theophylline a. Preparation of the starting material I. β-3,5-dichlorophenylethylamine 3.5-dichlorobenzylcyanide (46 g; 0.3 mol) [M. B. Pybus et al., Ann. Appln. Biol. 47, 593 (1959)] is dissolved in 250 ml. methanol which contains about 20 g ammonia and hydrogenated at 50° /70 atmospheres with Raney-Cobalt. Separation from the catalyst is effected and the filtrate is evaporated. The residue obtained therefrom is dissolved in hydrochloric acid and nonbasic impurities are removed by shaking with toluene. The base is regenerated by the addition of soda lye, dissolved in ether, dried with sodium hydroxide and the hydrochloride is precipitated by passing hydrogen chloride gas through it. After boiling with acetone, the salt melts at 233° to 236° C. The yield is 39 g, representing 89% of the theoretical yield.

II. N-methyl-β-3,5-dichloroethylamine

The base is regenerated from the hydrochloride obtained in Part I and by utilizing the method described in Example 1 (a) I, is converted into the formyl compound. By reduction of this amide with lithium alanate, N-methyl-β-3,5-dichlorophenylethylamine hydrochloride, having a melting point of 194° to 197° C is obtained. The yield represents 96% of the theoretical yield with respect to the primary base.

b. Preparation of the end product 7-(3-bromopropyl)-theophylline (32.4 g; 0.11 mol) and N-methyl-β-3,5-dichlorophenylethylamine (22 g; 0.11 mol) obtained from Part II above, are condensed together in the manner described in Example 9 with an equivalent quantity of triethylamine. Triethylamine hydrobromide is precipitated, the toluene filtrate is neutralized, and 7-[N-methyl-N-(β-3,5-dichlorophenylethyl)-3-aminopropyl]-theophylline hydrochloride is precipitated as a white crystalline powder. After crystallization from methanol, there is obtained 28.8 g, which is 58% of the theoretical yield, of pure salt having a melting point of 213° to 216° C.

EXAMPLE 14

7-[N-methyl-N-(β-3-chloro-4-methoxyphenylethyl)-3-aminopropyl]theophylline 7-(3-bromopropyl)-theophylline (50 g; 0.17 mol) and N-methyl-β-3-chloro-4-methoxyphenylethylamine (33.2 g; 0.17 mol) [M. Julia et al., Bull. Soc. Chim. France (1966) 1335] are condensed together with trimethylamine in the manner described in Example 9. After working up, the toluene solution of the required product is neutralized by passing hydrogen chloride gas through it and the precipitated hydrochloride is recrystallized from ethanol. A yield of 47.4 g, representing 62% of the theoretical yield, having a melting point of 245° to 248° C. is obtained.

EXAMPLE 15

7-[N-methyl-N-(β-3-methoxy-4-chlorophenylethyl)-3-aminopropyl]theophylline a. Preparation of the starting material I. β-3-methoxy-4-chlorophenylethylamine 3-methoxy-4-chlorobenzylcyanide (150 g; 0.83 mol) [S. Munavelli et al., Bull. Soc. Chim. Fr. 1966 (10) 33110-18] is dissolved in 600 ml. methanol containing 50 g ammonia and hydrogenated with Raney-Cobalt at 50°/70 atmospheres. After working up as described in Example 8 (a) I, 202 g (91% of the theoretical yield) of β-3-methoxy-4-chlorophenylethylamine hydrochloride having a melting point of 164° to 166° C. are obtained.

II. N-methyl-β-3-methoxy-4-chlorophenylethylamine

β-3-methoxy-4-chlorophenylethylamine hydrochloride (155.5 g; 0.7 mol) obtained in Part I is converted into the free base and treated in the manner described in Example 1 (a) I with formic acid. Subsequently reduction of the formamide thus obtained is effected with lithium alanate in an atmosphere of nitrogen. 147 g (89% of the theoretical yield) N-methyl-β-3-methoxy-4-chlorophenylethylamine hydrochloride having a melting point of 147° to 148° C. are obtained.

b. Preparation of the end product 7-(3-bromopropyl)-theophylline (150.6 g; 0.5 mol) and the free base obtained from 111.0 g (0.5 mol) N-methyl-β-3-methoxy-4-chlorophenylethylamine hydrochloride are condensed as described in Example 9 with triethylamine and worked up. The toluene solution of the required end products is neutralized with hydrogen chloride gas and the precipitated salt is recrystallized from ethanol. A yield of 152.5 g, representing 67% of the theoretical yield of 7-[N-methyl-N-(β-3-methoxy-4-chlorophenylethyl)-3-aminopropyl]-theophylline hydrochloride having a melting point of 232° to 235° C. is obtained.

EXAMPLE 16

7-[N-methyl-N-(β-2-chloro-3-methoxyphenylethyl)-3-aminopropyl]theophylline a. Preparation of the starting material I. 2-chloro-3-methoxybenzyl alcohol 2-chloro-3-methoxybenzoic acid (151 g; 0.81 M) [Gibson J. Chem. Soc. London (1926) 1428] is dissolved in 600 ml tetrahydrofuran and, over a period of 30 minutes, added dropwise to a mixture of 37 g lithium alanate (1.6 × 0.75 × 0.81 mol) and tetrahydrofuran (2:1) boiling under reflux. Boiling under reflux is then continued for a further 30 minutes. The reaction mixture is then decomposed by the successive dropwise addition of water and soda lye. The precipitated aluminum hydroxide is filtered off under suction and the filtrate is evaporated. As residue, 132 g (95% of the theoretical yield) of 2-chloro-3-methoxybenzylalcohol, which is a bright yellow viscous oil, are obtained.

II. 2-chloro-3-methoxybenzyl chloride

The 2-chloro-3-methoxybenzyl alcohol (132 g; 0.76 mol) is dissolved in 300 ml. toluene, the solution being stirred and cooled in ice for a period of 1 hour while thionyl chloride (100 g; 1.1 × 0.76 mol) is added dropwise. Subsequently, the solution is boiled under reflux for 1 hour, the solvent is evaporated off in vacuo and the residue is purified by fractional distillation. The fraction distilling over between 110° and 120° C/1 Torr has an $n_D^{25}$ of 1.5610 and is collected. There is thus obtained 74 g, which is 51% of the theoretical yield, of 2-chloro-3-methoxybenzyl chloride.

III. 2-chloro-3-methoxybenzyl cyanide

The 2-chloro-3-methoxybenzyl chloride (49g; 0.26 mol) obtained in Part II is added dropwise over a period of 30 minutes at 30° C. with stirring to a suspension of sodium cyanide (1.1 × 0.262 mol) 66 ml. in dimethyl sulfoxide. Stirring is continued for an additional 2 hours. The reaction mixture is then poured into 250 ml. water and extracted with ether. The combined ether solutions, after drying and evaporation, leave the crude nitrile, which is purified by vacuum distillation. There are thus obtained 36 g, which is 77% of the theoretical yield, of 2-chloro-3-methoxybenzyl cyanide having a boiling point of 140° C/0.1 Torr.

IV. β-2-chloro-3-methoxyphenylethylamine

By catalytic hydrogenation of the 36 g (0.2 mol) of the above obtained 2-chloro-3-methoxybenzyl cyanide, by the method described in Example 8 (a) I, there are obtained 36.5 g, which is 98% of the theoretical yield, of β-2-chloro-3-methoxyphenylethylamine hydrochloride having a melting point of 124° to 126° C.

V. N-methyl-β-2-chloro-3-methoxyphenylethylamine

The 36.5 g (0.164 mol) of the thus obtained hydrochloride is converted into the base. This latter, in the manner described in Example 1 (a) I, is reacted with formic acid to form the formamide, which by subsequent treatment with lithium alanate is converted into N-methyl-β-2-chloro-3-methoxyphenylethylamine. There are thus obtained 24.5 g, which is 74% of the theoretical yield, having a boiling point of 90° to 95° C/0.3 Torr and an $n_D^{25}$ of 1.5394. The hydrochloride melts at 192° to 195° C.

b. Preparation of the end product 7-(3-bromopropyl)-theophylline (33.2 g; 0.12 mol) and N-methyl-β-2-chloro-3-methoxyphenylethylamine (22.0 g; 0.12 mol) are condensed with triethylamine in the manner described in Example 9, and worked up. The toluene solution of the base is neutralized with hydrogen chloride gas, which causes the hydrochloride to be precipitated. This is then dissolved and allowed to crystallize from ethanol. The hydrochloride melts at 245° to 248° C. A yield of 32.2 g, representing 64% of the theoretical yield, of 7-[N-methyl-N-(β-2-chloro-3-methoxyphenylethyl)-3aminopropyl]-theophylline hydrochloride is obtained.

EXAMPLE 17

7-[N-methyl-N-(β-3,4-dichlorophenylethyl)-3-aminopropyl]theophylline a. Preparation of the starting material

I.

7-[3-(N-methyl-N-benzyl)-aminopropyl]-theophylline 7-(3-bromopropyl)-theophylline (301.2 g; 1 mol) and N-methylbenzylamine (242.3 g; 2 mol) are heated for 2 hours in an atmosphere of nitrogen, with stirring to a temperature of to 145° C. After the temperature has dropped to about 110° C., 2 l. toluene are added and the mixture is heated under reflux for 30 minutes. A fine crystalline deposit of 202 g N-methylbenzylamine hydrobromide, having a melting point of 160° C., is precipitated and separated off. The toluene solution is washed with water and then, by shaking with hydrochloric acid (1050 ml; 1N), is extracted. The aqueous hydrochloric acid phase precipitates the base on addition of 40% soda lye. This is dissolved in toluene and, after evaporation of the solvent, is distilled in vacuo. At 220° C/0.03 Torr, 311 g, representing 91% of the theoretical yield, of 7-[3-(N-methyl-N-benzyl)-aminopropyl]-theophylline distils over as a viscous bright yellow oil having an $n_D^{25}$ of 1.5748. The base is precipitated from ethanol and melts at 86° to 88° C. The hydrochloride, after being dissolved in ethanol and allowed to crystallize, melts at 214.5° to 216° C.

II. 7-(3-methylaminopropyl)-theophylline

Palladium-carbon-catalyst (10 g; 10%) is prehydrogenated in ethanol (100 ml). There is then added thereto a solution of 7-[3-N-methyl-N-benzyl)-aminopropyl]-theophylline (204.6 g; 0.6 mol) in 400 ml. ethanol which is shaken at 40° C. with hydrogen. The calculated quantity of hydrogen is absorbed within 6 hours. After separating the catalyst and evaporating the ethanol, an oil remains which is distilled in vacuo. At 192° to 194° C/0.03 Torr, 137 g, which is 91% of the theoretical yield, of 7-(3-methylaminopropyl)-theophylline having an $n_D^{25}$ of 1.5588 distils over. This has a melting point of 62.5° to 64.5° C. and the hydrochloride melts at 265° C.

III. β-3,4-dichlorophenylethyl chloride

To a solution of thionyl chloride (424.0 9; 1.1 × 3.24 mol) in 300 ml. diethylether, is added dropwise, in a period of 2 hours, a mixture of β-3,4-dichlorophenylethanol (618.5 g; 3.24 mol) [R. Fuchs, J. Am. Chem. Soc. 78, 5612 (1956)], dry pyridine (256.2 g; 3,24 mol) and 500 ml. diethylether. The mixture is boiled, the ether being distilled off. The mixture is then heated on a water bath until about 500 ml. distillate have been collected, the reaction mixture temperature rising to about 85° C. After the addition of 42 g thionyl chloride, stirring is continued for a further 2 hours at this temperature. The reaction mixture is then dissolved in 1 l. ether and poured into 1 l. iced water. The aqueous and ethereal layers are separated, and the aqueous portion is shaken twice more with ether. The combined ether extracts are washed with water and sodium bicarbonate solution, dried with calcium chloride and evaporated. The residue distils over at 142° to 145° C/11 Torr as a colorless oil having an $n_D^{25}$ of 1.5631. The yield amounts to 602 g, which is 80% of the theoretical yield.

b. Preparation of the end product

The 7-(3-methylaminopropyl)-theophylline (158.8 g; 2 × 0.316 mol) obtained from Part II and β-3,4-dichlorophenylethyl chloride (66.1 g; 0.316 mol) obtained from Part III are heated together to 145° C. with stirring for 3 hours. The mixture is allowed to cool to 110° C., whereupon 1 l. toluene is added and the mixture is boiled for 30 minutes under reflux. 7-(3-methylaminopropyl)-theophylline hydrochloride (90 g) is precipitated and filtered off under suction. It melts at 263° to 265° C. The toluene filtrate is washed with water and then the desired end product is extracted by stirring with hot hydrochloride acid (2.7 l.; 0.1N). The aqueous acid solution is then mixed with 40% soda lye, the thus precipitated base is dissolved in toluene and drying is effected by means of potassium carbonate. After evaporation of the solvent, there remains 103 g. 7-[N-methyl-N-(β-3,4-dichlorophenylethyl)-3-aminopropyl]-theophylline. A sample distilled in a bulb tube distils at 210° to 220° C/0.001 Torr (air bath temperature) as a pale yellow highly viscous oil and has an $n_D^{25}$ of 1.5840.

If the base (92 g) is dissolved in a hot mixture of 150 ml. ethanol and 300 ml. ethyl acetate, and hydrogen chloride gas is bubbled through to produce a low acid reaction, 95 g of the hydrochloride salt are precipitated. This is dissolved and allowed to crystallize from methanol. 91 g hydrochloride having a melting point of 226° to 228° C. are obtained, which prove on chromatographic analysis to be pure.

EXAMPLE 18

7-[N-methyl-N-(β-3-chloro-4-methoxyphenylethyl)-3-aminopropyl]-theophylline a. Preparation of the starting substance I. β-3-chloro-4-methoxy-phenylethyl chloride β-3-chloro-4-methoxy phenylethanol (750 g; 4.02 mol) [L. S. Fosdick et al., J. Org. Chem. 68, 842 (1946)] is chlorinated by the method described in Example 17 (a) III, by treatment with thionyl chloride and pyridine in a diethylether-solution. After working up, there are obtained 770.6 g, representing 94% of the theoretical yield, of β-3-chloro-4-methoxyphenylethyl chloride having a boiling point of 102° C/0.005 Torr and an $n_D^{25}$ of 1.5555.

b. Preparation of the end product 7-(3-methylaminopropyl)-theophylline (132.2 g; 2 × 0.27 mol) and β-3-chloro-4-methoxyphenylethyl chloride (55.6 g; 0.27 mol) are condensed and worked up as described in Example 17 (b). There is obtained 7-[N-methyl-N-(β-3-chloro-4-methoxyphenylethyl)-3-aminopropyl]-theophylline (111 g). A sample of the substance distils over at 225° to 230° C/0.001 Torr (air bath temperature) as a pale yellow oil having an $n_D^{25}$ of 1.5774.

If a solution of 100 g of this substance in 500 ml. ethanol is neutralized with hydrogen chloride gas, 82.4 g of a white salt are precipitated, which after recrystallization from methanol melts at 240° to 245° C. The yield of the hydrochloride is calculated to be 74% of the theoretical yield.

EXAMPLE 19

7-[N-methyl-N-(β-3,4-dichlorophenylethyl-3-aminopropyl]theophylline a. Preparation of the starting material In a three-necked flask, β-3,4-dichlorophenylethylamine (38 g; 0.2 mol) [F. Bennington et al., J. Or. Chem. 25, 2066 (1960)] and triethylamine (20.2 g; 0.2 mol) are mixed with 100 ml. toluene. While stirring at room temperature and over a period of 90 minutes, a suspension of 7-(3-bromopropyl)-theophylline (60.2 g; 0.2 mol) in 300 ml. toluene is introduced and the mixture is subsequently boiled for 16 hours under reflux. The precipitated triethylamine hydrobromide (possibly formed from β-3,4-dichlorophenylethylamine hydrobromide) is filtered off under suction, the filtrate is washed with water and evaporated in vacuo. The oily residue is then dissolved in 100 ml. isopropanol. After adding aqueous hydrobromic acid (15 ml.; 48%), crystals are precipitated, which are isolated and then dissolved and allowed to recrystallize from methanol. 57.5 g, representing 59% of the theoretical yield, of 7-[N-(β-3,4-dichlorophenylethyl)-3-aminopropyl]-theophylline-3-hydrobromide having a melting point of 243° to 245° C., are obtained.

b. Production of the end product

7-[N-(β-3,4-dichlorophenylethyl)-3-aminopropyl]theophylline (40.4 g; 0.1 mol) regenerated from the hydrobromide obtained in Part a is dissolved in 370 ml. ethanol and is mixed with formic acid (7.4 g; 1.6 × 0.1 mol). Aqueous formalin solution (40%, 11.1 g; 1.3 × 0.1 mol) is added and the mixture is boiled for 2 hours under reflux. The residue after evaporation of the reaction solution in dilute hydrochloric acid and shaken with toluene. From the aqueous acid solution, the base is separated out with soda lye, dissolved in toluene and dried. By passing hydrogen chloride gas into the toluene solution, there is precipitated 7-[N-methyl-N-(β-3,4-dichlorophenylethyl)3-aminopropyl]-theophylline hydrochloride. Recrystallization is effected from isopropanol. There are thus obtained 39.3 g, representing 82% of the theoretical yield, of the salt having a melting point of 225° to 228° C.

The same result is obtained if the alcoholic solution of the 7-[N-(β-3,4-dichlorophenylethyl)-3-aminopropyl]-theophylline is mixed with a calculated quantity of formalin solution and heated for 2 hours on a water bath with sodium borohydride or is shaken with hydrogen and a palladium-carbon-catalyst at 40° C.

EXAMPLE 20

7-[N-methyl-N-(β-3-chloro-4-hydroxyphenylethyl)-3-aminopropyl]theophylline

7-[N-methyl-N-(β-3-chloro-4-methoxyphenylethyl)-3-aminopropyl]-theophylline (56.1 g; 0.13 mol) prepared as described in Examples 14 and 18, is boiled under reflux for 2 hours with 120 ml. 48% aqueous hydrobromic acid (density 1.5) corresponding to 96.4 g HBr (2.18 × 2 × 0.13 mol). A further 60 ml. of 48% hydrobromic acid of (4.1 × 0.13 mol) is added and boiling is continued for a further hour. The reaction mixture is then poured into 1 l. iced water and accurately neutralized with 40% soda lye. The phenolic base is precipitated as an oil, which crystallizes on standing. The substance is dissolved in 2N hydrochloric acid, whereupon the hydrochloride precipitates out in the form of white crystals. After dissolving and recrystallizing from acetone there are obtained 25.2 g, which is 41% of the theoretical yield, of 7-[N-methyl-N-(β-3-chloro4-hydroxyphenylethyl)-3-aminopropyl]-theophylline hydrochloride having a melting point of 114° to 116° C.

EXAMPLE 21

7-[N-methyl-N-(β-3-hydroxy-4-chlorophenylethyl)-3-aminopropyl]theophylline

In a manner similar to that described in Example 20, 7-[N-methyl-N-(β-3-methoxy-4-chlorophenylethyl)-3-aminopropyl]theophylline (10.7 g; 0.23 mol), prepared as in Example 15 is subjected to ether cleavage with 34.4 ml. 48% aqueous hydrobromic acid. The crude phenolic base obtained after working up is dissolved in acetone and mixed with the solution of maleic acid (3.5 g) in acetone. The crystals, which are precipitated after a short time, are dissolved and recrystallized from acetone. 43 g, representing 32% of the theoretical yield, of 7-[N-methyl-N-(β-3-hydroxy-4-chlorophenylethyl)-3-aminopropyl]-theophylline maleate having a melting point of 190° to 193° C. are obtained.

EXAMPLE 22

7-[N-methyl-N-(β-2-chloro-3-hydroxyphenylethyl)-3-aminopropyl]theophylline

7-[N-methyl-N-(β-2-chloro-3-methoxyphenylethyl)-3-aminopropyl]-theophylline (30.1 g; 0.072 mol), produced as described in Example 16, is boiled under reflux with 97 ml. 48% aqueous hydrobromic acid for 4 hours and worked up as described in Example 21. There are thus obtained 8.8 g, representing 24% of the theoretical yield, of 7-[N-methyl-N-(β-2-chloro-3-hydroxyphenylethyl)-3-aminopropyl]-theophylline maleate, which after being dissolved and crystallized from acetone, melts at 195° to 196° C.

EXAMPLE 23

7-[N-methyl-N-(β-3,4-dihydroxyphenylethyl)-3-aminopropyl]theophylline

In a three-necked flask, 7-(methyl-N-homoveratryl3-aminopropyl)-theophylline hydrochloride (226 g; 0.5 mol) is mixed with 672 ml. 48% aqueous hydrobromic acid (density 1.5), which are equivalent to 485 g HBr (4 × 3 × 0.5 mol), and the mixture is boiled under an atmosphere of nitrogen. Even at 80° C., a lively bromomethane reaction occurs, which after boiling for 3 hours under reflux, terminates. 96% of the calculated bromoethane quantity is split off. The clear solution sets on cooling into a thick crystalline slurry which is extracted and washed with isopropanol. There are thus obtained 248 g of the hydrobromide of the phenol base, which contains water of crystallization. By dissolving and recrystallizing a sample of this salt from methanol, there is formed the anhydrous salt having a melting point of 238° C.

The above hydrobromide (100 g) is dissolved in 2.5 l. hot water. After cooling to room temperature, 500 ml. ammonia (2N) are added under an atmosphere of nitrogen, whereupon a pale-pink colored substance of oily consistancy is precipitated. The aqueous phase is decanted off, the substance is washed with water and dissolved in 2 l. ethanol. An excess of hydrogen chloride gas is bubbled into the filtered solution, which is clear, whereupon 78 g of 7-[N-methyl-N-(β-3,4-dihydroxyphenyl)-3-aminopropyl]-theophylline dihydrochloride are precipitated as a white crystalline powder having a melting point of 208° to 213° C. The yield obtained represents 84% of the theoretical yield. If a 5% aqueous solution of the dihydrochloride (pH 1.0) is mixed with 1 equivalent of soda lye, there is obtained an aqueous solution of the monohydrochloride, which has a pH of 6.7. The monohydrochloride, in water or methanol, gives a dark green coloration with ferric (III) chloride, which becomes violet on the addition of soda lye.

EXAMPLE 24

7-[N-methyl-N-(β-3-fluoro-4-hydroxyphenylethyl)-3-aminopropyl]theophylline

7-[N-methyl-N-(β-3-fluoro-4-methoxyphenylethyl)-3-aminopropyl]-theophylline hydrochloride (60.3 g; 0.137 mol), prepared as described in Example 7 and 123 ml. 48% aqueous hydrobromic acid (density 1.5), which is equivalent to 89 g HBr (4 × 2 × 0.137 mol) are boiled under reflux in a round-bottomed flask for 10 hours. After 3 hours the calculated quantity of bromoethane has split off. The colorless solution obtained is mixed with an equal volume of diethylether, whereupon 7-[N-methyl-N-(β-3-fluoro-4-hydroxyphenylethyl)-3-aminopropyl]theophylline hydrobromide separates out in crystalline form. After dissolving and crystallizing from isopropanol, there are obtained 59.4 g, which is 92% of the theoretical yield, of the salt as a white crystalline powder having a melting point of 72.5° to 75° C. On further heating, the melt resolidifies at about 145° C. and then re-melts at 225° to 227° C.

The above hydrobromide (53.6 g; 0.11 mol) is dissolved in 1.3 l. warm water and, by adding 114 ml. 1N soda lye dropwise under an atmosphere of nitrogen, the pH of solution is adjusted to 7.0. 43.5 g of the base are precipitated as a white crystalline powder having a melting point of 130° to 132° C. After dissolving and crystallizing from isopropanol, the melting point does not change. A solution of the base in methanol gives a yellow-red coloration with ferric (III) chloride.

If the dried base is dissolved in methanol and hydrogen chloride gas is bubbled through until a weak acid reaction takes place, the hydrochloride separates out as a white crystalline powder. This powder, after dissolving and crystallizing from a water/ethanol mixture (1:5), melts at 234.5° to 237° C. A solution of this compound in water gives a yellow coloration with ferric (III) chloride while a methanolic solution gives a pale violet coloration.

EXAMPLE 25

On a tablet press, tablets are pressed in a known manner having the following composition:

100.00 mg. 7-[N-methyl-N-(β-3,4-dichlorophenylethyl)-3-aminopropyl]-theophylline hydrochloride
50.00 mg. corn starch
4.50 mg. gelatine
15.00 mg. lactose
7.50 mg. talc
0.75 mg. Aerosil (R.T.M.) which is chemically pure silicic acid in a submicroscopically fine distribution
2.25 mg. potato starch (in the form of a thin 6% paste)

EXAMPLE 26

Coated pills of the following composition are produced in a known manner:

10.00 mg. 7-[N-methyl-N-(β-2,6-dichlorophenylethyl)-3-aminopropyl]-theophylline hydrochloride
50.00 mg. carrier
40.00 mg. sweetening composition The carrier comprises 9 parts corn starch, 3 parts lactose and 1 part Luviskol (R.T.M.) VA 64 (a vinylpyrrolidone-vinyl acetate mixed polymerisate in a 60:40 ratio, as described in Pharm. Ind. 1962, 586. The sweetening composition consists of 5 parts cane sugar, 2 parts corn starch, 2 parts calcium carbonate and 1 part talc. The pills so produced are subsequently provided with a gastric juice resistant coating.

EXAMPLE 27

7-[N-methyl-N-(β-2,4-dichlorophenylethyl)-3-aminopropyl]-theophylline hydrochloride (2.0 mg.) is dissolved in 2.0 ml. water, standardized isotonically with sodium chloride, and is filled in a sterile manner in ampoules of 2 ml. capacity.

We claim:
1. 7-[N-methyl-N-(β-3,4-dichlorophenylethyl)-3-aminopropyl]-theophylline.
2. 7-[N-methyl-N-(β-3-chloro-4-hydroxyphenylethyl)-3-aminopropyl]-theophylline.

* * * * *